United States Patent
Rausch et al.

(10) Patent No.: US 7,140,683 B2
(45) Date of Patent: Nov. 28, 2006

(54) MOTOR VEHICLE SEAT

(75) Inventors: Peter Rausch, Coburg (DE); Wolfgang Suck, Coburg (DE); Christina Schwerdtner, Neustadt (DE)

(73) Assignee: Brose Fahrzeugtelle GmbH & Co KG, Coburg, Coburg (DE)

( * ) Notice: Subject to any disclaimer, the term of this patent is extended or adjusted under 35 U.S.C. 154(b) by 388 days.

(21) Appl. No.: 10/416,932

(22) PCT Filed: Nov. 13, 2001

(86) PCT No.: PCT/DE01/04275

§ 371 (c)(1),
(2), (4) Date: Dec. 10, 2003

(87) PCT Pub. No.: WO02/40309

PCT Pub. Date: May 23, 2002

(65) Prior Publication Data

US 2004/0075324 A1 Apr. 22, 2004

(30) Foreign Application Priority Data

Nov. 15, 2000 (DE) ................................ 100 57 712

(51) Int. Cl.
*B60N 2/20* (2006.01)
(52) U.S. Cl. ..................................................... 297/341
(58) Field of Classification Search ................ 297/341, 297/378.12; 248/429, 430
See application file for complete search history.

(56) References Cited

U.S. PATENT DOCUMENTS 4,742,983 A * 5/1988 Nihei ........................ 248/429

(Continued)

FOREIGN PATENT DOCUMENTS

DE           27 24 048 A1    12/1978

(Continued)

OTHER PUBLICATIONS

International Search Report of PCT/DE01/04275, dated Jul. 23, 2002.

(Continued)

*Primary Examiner*—Peter R. Brown
(74) *Attorney, Agent, or Firm*—Christie, Parker & Hale LLP

(57) ABSTRACT

The invention relates to a motor vehicle seat comprising a seat frame; a backrest, which is pivotably mounted on the seat frame and which may be folded forward in the direction of a seating surface on the seat frame; a longitudinal guide, along which the seat frame may be moved to adjust the seat longitudinal position in the seat longitudinal direction; a fixing device for fixing the seat frame in a seat longitudinal position; an operating element for releasing the fixing device, such that the seat frame may be moved in the seat longitudinal direction to adjust the seat longitudinal position; a coupling mechanism, displaceable together with the seat frame in the seat longitudinal direction, acting on the operating element and releasing the fixing device, when the backrest is folded forward; a memory device, by means of which, during movement in the seat longitudinal direction, the seat frame can be automatically retained in a predetermined seat longitudinal position, defined as the memory position; adjuster means for the memory device, with which the memory position may be adjusted in the seat longitudinal direction and a locking device for the memory device, for locking an adjusted memory position. According to the invention, a first catch element which may be moved by the coupling device is provided, corresponding to a second catch element, provided on the memory device whereby both catch elements engage with each other to prevent movement of the seat frame in the seat longitudinal direction, when the seat frame is in the memory position thereof, the locking device is locked and the fixing device is not completely released by means of the coupling mechanism, but is already far enough released that a movement of the seat frame in the seat longitudinal direction is possible.

22 Claims, 12 Drawing Sheets

U.S. PATENT DOCUMENTS

| | | | | |
|---|---|---|---|---|
| 4,881,774 A | * | 11/1989 | Bradley et al. | 297/341 |
| 5,020,853 A | * | 6/1991 | Babbs | 297/341 |
| 5,052,751 A | * | 10/1991 | Hayakawa et al. | 297/341 |
| 5,597,206 A | * | 1/1997 | Ainsworth et al. | 297/378.12 |
| 5,605,377 A | * | 2/1997 | Tame | 297/341 |
| 5,899,532 A | * | 5/1999 | Paisley et al. | 297/341 |
| 5,944,383 A | * | 8/1999 | Mathey et al. | 297/341 |
| 6,048,030 A | * | 4/2000 | Kanda et al. | 297/341 |
| 6,227,596 B1 | * | 5/2001 | Foucault et al. | 296/65.13 |
| 6,341,819 B1 | * | 1/2002 | Kojima et al. | 297/341 |
| 6,513,868 B1 | * | 2/2003 | Tame | 297/341 |

FOREIGN PATENT DOCUMENTS

| | | |
|---|---|---|
| DE | 36 08 827 A1 | 10/1987 |
| DE | 38 09 135 A1 | 10/1988 |
| DE | 38 17 495 A1 | 11/1989 |
| DE | 42 01 829 A1 | 6/1993 |
| DE | 196 33 780 C2 | 2/1998 |
| DE | 299 10 720 U1 | 9/1999 |
| WO | WO 00/55002 | 9/2000 |

OTHER PUBLICATIONS

International Preliminary Examination Report of PCT/DE01/04275, dated Jan. 7, 2003.

* cited by examiner

MOTOR VEHICLE SEAT

CROSS-REFERENCE TO RELATED APPLICATION

This application is a National Phase Patent Application of International Application Number PCT/DE01/04275, filed on Nov. 13, 2001, which claims priority of German Patent Application Number 100 57 712.1, filed Nov. 15, 2000.

FIELD OF THE INVENTION

The invention relates to a motor vehicle seat.

BACKGROUND

Seats of this kind comprise a seat frame, a seat surface provided on the seat frame, and a backrest which is mounted for swivel movement on the seat frame and which can be folded forward toward the seat surface, and are used as front seats in motor vehicles whereby folding the backrest forward makes it easier for a passenger to climb into the back of the vehicle or to place an object in the back of the vehicle. Climbing in is made even easier, which is particularly important in the case of two-door vehicles, if after folding the backrest forward the seat can be moved forward. For this the vehicle seat has the following:
- a longitudinal guide with which the seat frame can be moved in the seat longitudinal direction for adjusting the seat longitudinal position;
- a fixing device for locking the seat frame in a previously set seat longitudinal position;
- an operating element for releasing the fixing device so that the seat frame can be moved in the seat longitudinal direction;
- a coupling mechanism for coupling the fixing device to the backrest which acts on the operating element and thereby unlocks the fixing device when the backrest is folded forward toward the seat surface;
- a memory device by means of which the seat frame during movement in the seat longitudinal direction can be stopped automatically in a predeterminable seat longitudinal position defined as the memory position whereby a stop dedicated to the seat frame and movable in the seat longitudinal direction enters into engagement with a counter stop of the memory device;
- adjusting means for the memory device with which the memory position can be adjusted through moving the position of the counter stop in the seat longitudinal direction;
- a locking device for the memory device for locking a set memory position and switch means with which the locking device can be unlocked in order to be able to adjust the memory position.

A seat of this kind known from WO 00/55002 offers on the one hand the possibility after folding the backrest forward toward the seating surface of sliding the seat frame, and thus the entire vehicle seat, forward in order to make it easier for a passenger to climb into the back (easy-entry function). At the same time the seat can then be very easily moved again into its original seat longitudinal position when this seat longitudinal position is stored as the memory position by means of the memory device provided for this purpose. In this case the seat frame on sliding back the seat is automatically stopped in the memory position whereby a stop dedicated to the seat frame interacts with a counter stop of the memory device.

SUMMARY OF THE INVENTION

The object of the invention is to improve a motor vehicle seat of the type already mentioned.

According to this a first engagement element is provided which is movable by the coupling mechanism and which is associated with a second engagement element mounted on the memory device whereby the two engagement elements engage with each other in order to prevent movement of the seat frame in the seat longitudinal direction when
  a) the seat frame is located in its memory position;
  b) the locking device of the memory device is locked and
  c) the fixing device of the longitudinal guide is still not completely released by the coupling mechanism, but just enough so that movement of the seat frame in the seat longitudinal direction would be possible.

By seat frame is meant here all those constituent parts of the support seat structure which can be moved in the seat longitudinal direction, thus in particular those constituent parts of the seat longitudinal guide, such as e.g. a seat rail (upper rail) which are moved in the longitudinal direction when adjusting the seat longitudinal position.

With the solution according to the invention, it is possible to prevent unacceptable noises which occur when a passenger on actuating the easy-entry functions has not folded the backrest far enough forward or attempts to slide the seat frame if the backrest has not been folded far enough onto the seat surface. Sliding the seat frame when the backrest has not been folded far enough forward and thus the fixing device for the longitudinal guide has not been completely released generally has the result that different component parts of the fixing device grind against each other and thereby create the aforementioned noises. These can even be interpreted under certain circumstances by a vehicle occupant to be the result of a defect in the seat adjusting device so that he could think there was a lack of quality in the vehicle seat.

With the solution according to the invention, movement of the seat frame when the fixing device has not been fully released is prevented since an engagement element provided on the memory device interacts with an engagement element provided on the coupling mechanism so that displacement of the seat frame is impossible. The first engagement element can hereby be mounted directly on the coupling mechanism itself, e.g. on a lever which is provided for the action of the coupling mechanism on the fixing device. The second engagement element is preferably mounted on the locking device for the memory device.

The locking device for the memory device preferably consists of a locking unit which can be displaced in the seat longitudinal direction together with a counter stop of the memory device defining the memory position, and of a catch device which is associated with the locking unit and which has detent positions mounted in succession in the seat longitudinal direction and on which the locking unit can be locked relative to the catch device in order to fix the memory position.

The locking unit can comprise for example a swivel mounted locking pawl which has a catch element which can engage in the detent positions of the catch device whereby the locking pawl is provided with an actuating section on which switch means can act in order to let the catch element engage in and out of the catch device. With a locking device of this kind the second engagement element can be mounted more particularly on the locking pawl of the locking device.

The engagement elements themselves can be simply formed by stops which can be brought into contact with each other to produce the engagement. Thus one of the engagement elements can be a claw which engages round the other engagement element in order to produce the engagement.

The fixing device can comprise in known way locking teeth of which in order to lock the seat longitudinal guide or seat frame at least one can be inserted into a catch opening which belongs to a group of catch openings provided in succession along the longitudinal guide in the seat longitudinal direction. When using a conventional fixing device of this kind the two engagement elements according to the invention always then engage with each other to prevent movement of the seat frame by means of the longitudinal guide in the seat longitudinal direction when the locking teeth are already lifted by the coupling mechanism so far out of the catch openings that the seat fame would be displaceable in the seat longitudinal direction whereby however the locking teeth would grind over the edges of the catch openings because the locking teeth have not yet been completely lifted clear of the catch openings (still no complete release of the fixing device).

With a complete release of the fixing device the two engagement elements are however no longer to stand in engagement so that adjustment of the seat longitudinal position is readily possible.

The solution according to the invention can be applied not only to seats with easy-entry function but generally to seats which have a (manually operable) release mechanism (more particularly designed as an operating lever) which serves to unlock the fixing device of the seat longitudinal guide.

In a further preferred embodiment of the invention, it is proposed that the coupling mechanism which acts on the operating element of the fixing device and unlocks this when the backrest is folded forward toward the seat surface, only acts on the operating element so long as the backrest is folded forward. Thus, the seat frame can be locked at any time by locking the fixing device if the backrest is no longer folded forward, having been folded back again into its useful position. This means, in particular, that with the backrest raised up the ability of the seat frame to be locked in a current seat longitudinal position is independent of whether or not the relevant seat longitudinal position corresponds to the memory position or not.

This leads, on the one hand, to an improvement in the operating comfort since there is much more variability in the seat longitudinal positions which can be adjusted and locked according to the design of the easy entry function. At the same time, the functional reliability is improved since the seat can also then be locked when it is not located in the memory position so that there is no security risk resulting from an inadequately secured seat.

In a preferred embodiment of the invention, locking means are also provided which are coupled to the backrest and which when the backrest is folded forward act on the switch means which are provided for unlocking the locking device of the memory device so that when the backrest is folded forward unlocking of the locking device is prevented. This means that when the backrest is folded forward the locking device of the memory device is already locked so that there can be no change in the memory position.

The locking means can be coupled to the backrest, for example, through a push member or draw member, more particularly in the form of a cable. However, for coupling a lever assembly can also be used or even some other gearing.

It is only necessary that the means used for coupling are suitable to convert a swivel movement of the backrest into a movement of a locking element and to bring this into a position in which it blocks any release of the locking device of the memory device.

The locking means can thereby be coupled to the backrest through the same coupling mechanism as the operating element which when the backrest is folded forward causes release of the fixing device of the seat longitudinal guide.

In order to bring a locking element of the locking means into engagement with the switch means it can be proposed, for example, that the locking element is moved in the seat longitudinal direction when folding the backrest forward. As an alternative a swivel movement of the locking element as the backrest is folded forward, or another type of movement can be provided.

The locking element has, e.g., a stop which when the backrest is folded forward enters into active connection with the switch means in order to thereby block unlocking of the locking device of the memory device. As an alternative, the locking element can also be connected to the switch means and when the backrest is folded forward acts on the switch means so that release of the locking device is hereby prevented.

The switch means provided for releasing the locking device of the memory device can be formed for example by a shift lever or by a shift spring whereby the former is swivelled to release the locking device and the latter is deformed. Likewise a displaceable switch means can be used.

The switch means are preferably mounted on the seat frame and are arranged so that they can then only act on the locking device to release same when the seat frame is located in the memory position. This means that changing the memory position which does indeed presuppose a release of the locking device, can then only be undertaken when the seat frame is located in the current memory position.

In an advantageous further development, the switch means are elastically pretensioned toward a first switch position and can be switched against the action of this pretension into a second switch position whereby in one of the two switch positions the locking device is locked and in the other switch position the locking device is unlocked.

In one embodiment of the invention, the switch means are coupled to the fixing device of the seat longitudinal guide when the seat frame is located in the memory position and can thereby be switched simultaneously when actuating the fixing device.

According to one variation, the switch means are hereby switched when unlocking the fixing device so that the locking device is released. This means that when unlocking the fixing device of the seat longitudinal guide in the memory position the locking device of the memory device is also released at the same time so that a new memory position can be set. It can hereby be ensured however through the aforementioned locking means that this is only then possible if the backrest is not located in the forward-folded position. For when sliding the seat for the purpose of easy entry into the vehicle there should as a rule be no change to the memory position.

According to another variation, when locking the fixing device of the seat longitudinal guide the switch means are switched so that the locking device of the memory device is released. With this variation the adjusting means for the memory device which are provided for changing the memory position are automatically switched free when locking the fixing device of the seat longitudinal guide. If then the fixing device is again unlocked in order to be able to move the seat frame in the seat longitudinal direction then at the same time a correction to the memory position can take place. Obviously it is also possible here by means of the aforementioned locking means that the disconnection of the adjusting means of the memory device is only possible when the backrest is not folded forward.

Furthermore, it can be proposed that in the memory position of the seat frame when the backrest is not folded forward and when the locking device of the memory device is released the switch means are supported so that during unlocking of the fixing device the switch means are not switched. For this the switch means can be supported, for example, on a supporting surface or can also be pretensioned into a determined position by means of an elastic element.

In order to prevent that when reaching the memory position the adjusting means of the memory device are automatically disconnected with the result that with subsequent adjustment of the seat longitudinal position the memory position would also be changed at the same time, it can be proposed that the switch means on reaching the memory position with the backrest not folded forward are initially deactivated and thereby an immediate release of the locking device of the memory device is blocked. With a subsequent locking of the fixing device the switch means can then be actuated so that they can again act on the locking device of the memory device for release. This can be caused in particular in that the locking device is automatically released during subsequent release of the fixing device.

In order to deactivate the switch means when arriving at the memory position with the backrest not folded forward it can be proposed that the switch means are associated with a guide surface of the memory device and that this guide surface is designed so that the switch means on reaching the memory position are guided along the guide face and thereby cannot act on the locking device. With subsequent locking of the fixing device the switch means can then be actuated automatically so that they are lifted again from the guide surface. With a subsequent renewed unlocking of the fixing device (with backrest not folded forward) the switch means can then act again on the locking device of the memory device in order to disconnect the adjusting means.

In another embodiment, the switch means are associated with a stop face of the memory device which is arranged so that when arriving at the memory position with the backrest not folded forward it acts on the switch means in order to prevent release of the locking device through the switch means. With subsequent locking of the fixing device the switch means can thereby be actuated so that they are lifted again from the stop face.

In a preferred further development of the invention the locking device of the memory device is elastically pretensioned in the direction of its locked position and the switch means can act in the memory position with the backrest not folded forward on the locking device so that this is unlocked against the elastic pretension.

In order when adjusting the seat longitudinal position to be able also at the same time to adapt the memory position the memory device has a follower which can be brought into engagement with the seat frame so that the counter stop and the locking unit of the memory device together with the seat frame can be moved in the seat longitudinal direction. The follower is for this purpose associated with an engagement area of the seat frame and the follower can be brought into engagement with the engagement area by swivelling the follower and engagement area relative to each other.

The follower and engagement area are preferably only then brought into engagement with each other when the seat frame is located in the memory position and when the locking device of the memory device is released. The follower itself can be mounted for example on the locking pawl.

The adjusting means with which the memory position can be adjusted can advantageously be formed by a slide member which is mounted movable in the seat longitudinal direction and on which the locking unit and counter stop of the memory device are mounted.

BRIEF DESCRIPTION OF THE DRAWINGS

Further features and advantages of the invention will now be explained with reference to the following description of embodiments illustrated in the drawings in which.

DETAILED DESCRIPTION

Figure 11:
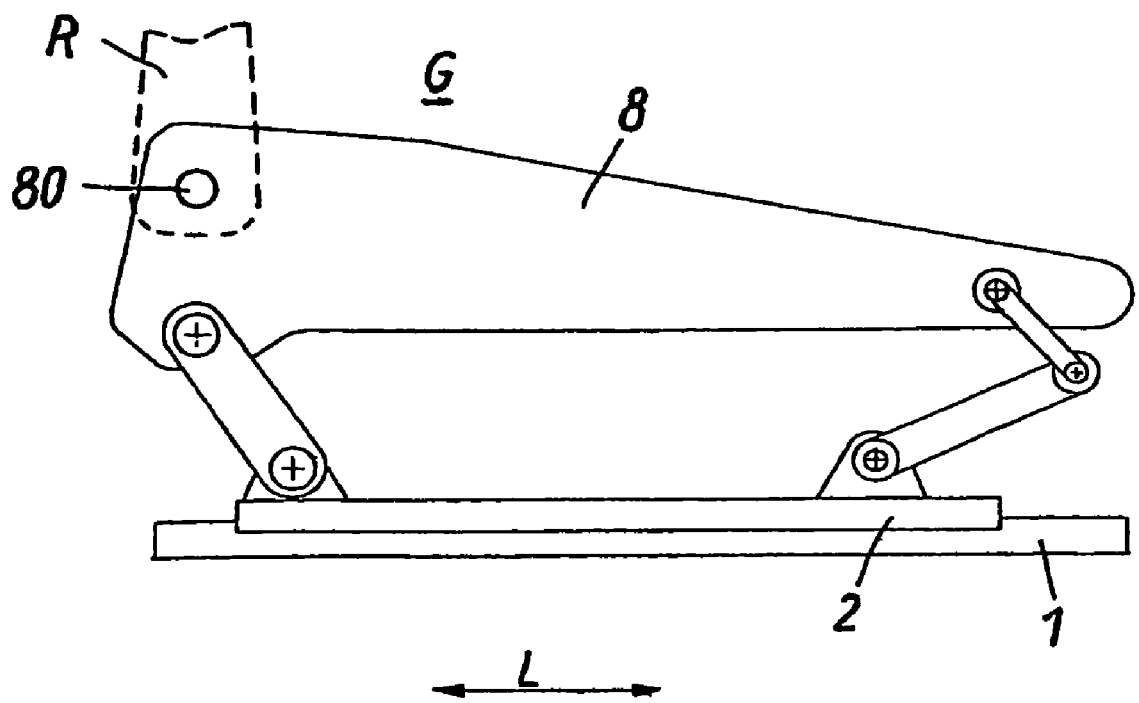
FIG. 11 shows a diagrammatic view of a seat frame.

The seat frame G (underneath seat frame) illustrated in a side view in FIG. 11 comprises a seat rail 2 which is mounted movable in the seat longitudinal direction L on a lower rail 1 which is to be fixed on the vehicle body, and a seat side part 8 which is attached vertically adjustable on the seat rail 2 through front and rear articulated levers. On its other longitudinal side (which cannot be seen in FIG. 11) the seat frame G has a corresponding assembly. Between the two seat side parts of the seat frame G extends a seat surface which holds a seat cushion on which a vehicle occupant can sit.

Furthermore the side parts 8 of the seat frame G each have a bearing point 80 for swivel mounting a backrest R (shown in chain-dotted lines in FIG. 11).

Here parts of the seat frame are to mean all those component parts which are movable in the seat longitudinal direction on the lower rail 1 which is fixed to the body, thus in particular the seat rail 2, the seat side part 8 as well as the further component parts of the seat connected thereto.

If a vehicle seat of this kind which is adjustable in the longitudinal direction L is used for a two-door vehicle, it is known in order to facilitate entry into the back of the vehicle to couple the backrest to the seat longitudinal adjuster, namely, so that when folding the backrest R forward toward the seat surface, which extends between the seat side parts 8, a fixing device associated with the seat longitudinal guide 1, 2 is released and the seat can be pushed forward with the backrest folded forward. This is called an easy-entry function.

In the following, the basic principle of the easy-entry function using a programmable memory device for automatically seeking a predeterminable seat longitudinal position will be explained, using a seat arrangement known from WO 00/55002 and illustrated in FIGS. 6 to 10. For further details on this reference is made to WO 00/55002 which is expressly relevant to the subject of the present description.

Figure 6:
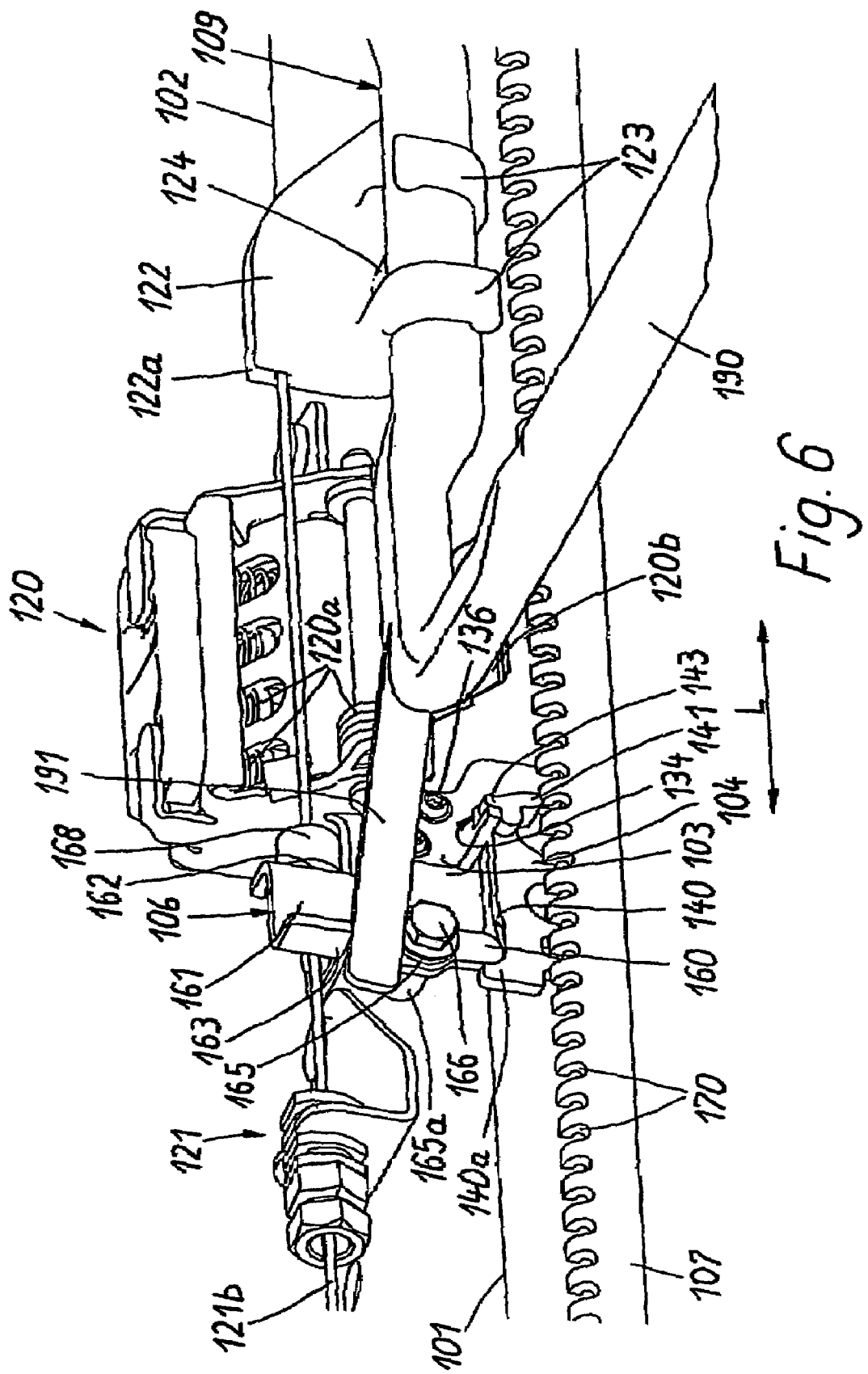
FIG. 6 shows a perspective view of a seat frame known from the prior art and having a seat longitudinal guide, a fixing device for the seat longitudinal guide as well as a programmable memory device for automatically seeking a predeterminable seat longitudinal position, in a state where the seat is locked with the raised up backrest in its memory position.
Figure 6A:
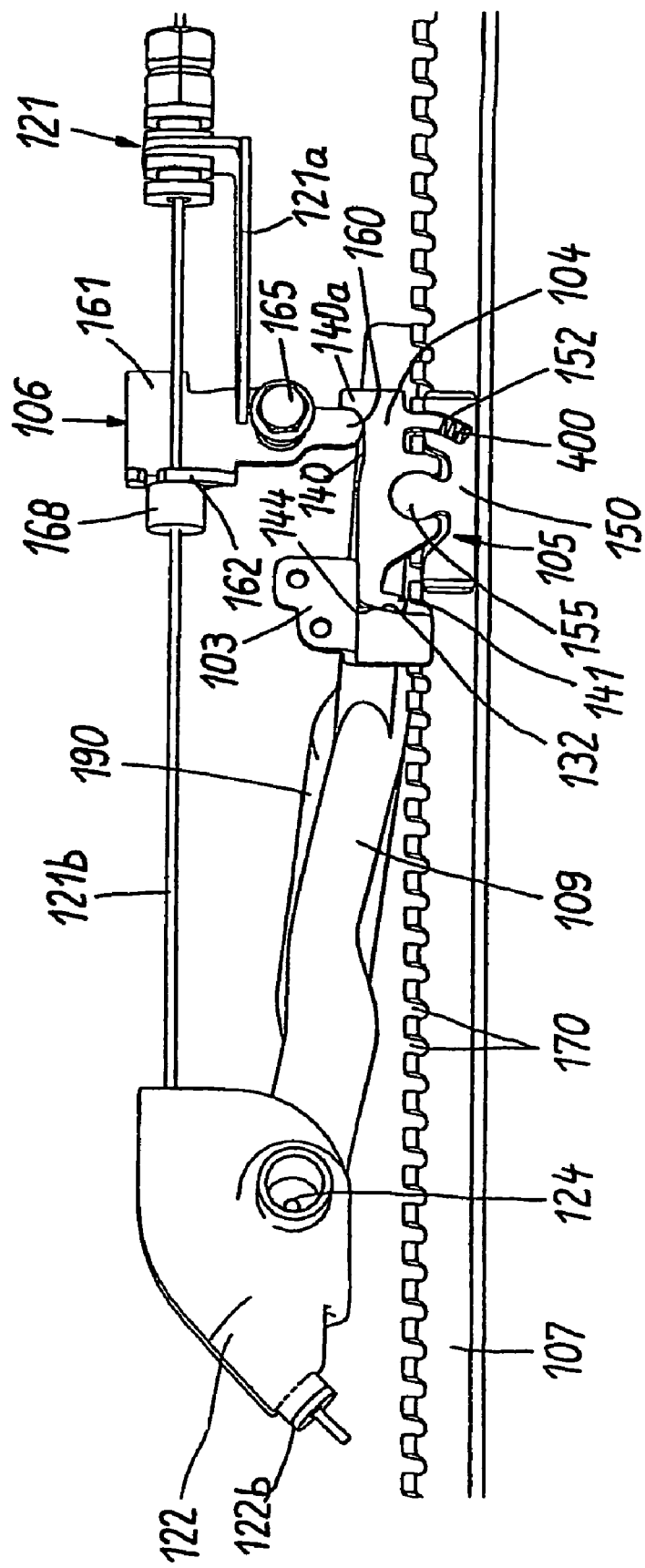
FIG. 6*a* shows a rear view of the illustration in FIG. 6.

A rail 101 fixed on the body, and a seat rail 102 movably guided thereon in the seat longitudinal direction L are shown in the perspective front view according to FIG. 6 and the associated rear view according to FIG. 6*a*. A ratchet rail 107 having a number of detent openings 170 arranged in succession in the seat longitudinal direction L is fixed on the rail 101 which is fixed on the body. The seat rail 102 supports the remaining components of the seat frame, see FIG. 11.

The seat rail 102 is lockable by means of a fixing device 120 relative to the rail 101 fixed on the body. The fixing device can be a conventional fixing device used for longitudinally adjusting the seat. FIGS. 6 and 6*a* show the housing, a swivel mounted operating element 120*b* as well as a torsion spring of a known fixing device acting on the operating element 120*b*, with the housing of the fixing device fixed on the seat rail 2. The torsion spring serves, inter alia, to take the play out of the assembly in order to prevent chattering noises.

This fixing device comprises for example according to DE 299 10 720 U1 a number of locking teeth arranged inside the housing and pretensioned—by means of coil springs mounted in the housing—elastically toward a catch device fixed on the body-side rail 1 but not shown in FIGS. 6 and 6*a*. As a result of the pretension acting on the locking teeth, these locking teeth which are associated with the seat rail 102 engage automatically into the catch device fixed on the body so that the longitudinal seat adjustment is locked unless the locking teeth are brought out of engagement with the catch device by means of the operating element 120*b* provided for this purpose.

Since the operating element 120*b* of the fixing device 120 is pretensioned by means of the spring assembly 120*a*, which consists of the springs mounted inside the housing and acting on the locking teeth, as well as the torsion spring mounted outside of the housing, against the direction into which it has to be swivelled to release the fixing device 120, the fixing device 120 can only then be released when a force is exerted on the operating element 120*b* against the action of the spring assembly 120*a*.

In order to release the fixing device 120, the operating element 120*b* can be actuated, on the one hand, by a seat user direct who grips an operating lever 109, which has a cross bar 190 and is pivotally attached to the seat frame, by the operating handle 190 provided for this purpose (not visible in FIGS. 6 and 6*a*) and swivels this handle anti-clockwise whereby the operating element 120*b* moves downwards against the pretension of the spring assembly 120*a*. On the other hand, the fixing device 120 can also be released by folding the seat back forward whereby the seat back is coupled to the operating lever 109 through a Bowden cable which has a cable 121*b* and whose Bowden tube (not shown) is supported on a Bowden cable support 121. Furthermore a gearing part 122 having a guide 122*a* and a suspension mounting 122*b* for the cable 121*b* of the Bowden cable is mounted on the swivel axis of the operating lever 109 by means of an axle shaft 124. This gearing part 122 converts a tightening of the cable 121*b* as the backrest is folded forward into a swivel movement which in turn is transferred by two arms 123 of the gearing which engage round the operating lever 109, to this operating lever. The operating lever 109 hereby swivels clockwise as the backrest is folded forward and releases the fixing device 120 through the operating element 120*b*.

A cable nipple 168 is fixed, e.g. squashed on the cable 121*b* of the Bowden cable between the Bowden support 121 which is fixed on the seat rail by means of a fixing plate 121*a*, and the gearing 122. The cable nipple 168 is associated with a switch element in the form of a switch lever 106 which is mounted by means of a bearing bush 165, a stepped bolt 165*a* and a screw 166 to swivel about an axis formed through the longitudinal axis of the stepped bolt 165*a*, and which is fixed at the same time on the seat frame or its seat frame 102. The switch lever 106 has in an upper section 161 a stop 162 which is mounted directly adjacent the cable nipple 168 and on which the cable nipple 168 can act in the seat longitudinal direction whereby the switch lever 106 is swivelled.

The second end section of the switch lever 106 mounted underneath the bearing bush 165 and the stepped bolt 165*a* forms an operating section 160 which is associated with an operating section of a locking pawl 104 of the memory device. The operating section of the locking pawl 104 is formed by an operating surface 140 on the top side of the locking pawl.

The switch lever 106 is here locked by a projection 191 of the operating lever 109 on which the upper section 161 of the switch lever 106 is vertically supported with a stop 163 (transversely to the seat longitudinal direction L), in the position illustrated in FIGS. 6 and 6*a* in which its operating section 160 acts on the operating surface 140 of the locking pawl 104. The moment required for this is applied by the spring assembly 120*a* of the fixing device 120 which acts on the lever projection 191 through the operating element 120*b* and the operating lever 109.

As an alternative or in addition, the vertical position of the shift lever 106 can also be assisted by a spring mounted directly on the shift lever 106 or by the shift lever 106 being mounted with sufficient friction which cannot be overcome by the action of the compression spring 400 of the locking pawl 104.

The locking pawl 104 itself is as can be seen from FIG. 6*a* mounted for swivel movement on the bearing pin 155 of a slider 105 which is guided by a base body 150 movable in the seat longitudinal direction L next to the catch openings 170 of the ratchet rail 107. The slider has in its base body 150 a recess 152 in which a compression spring 400 is mounted which acts underneath the operating section 140 of the locking pawl 104 on the locking pawl which is then pretensioned so that a detent hook 141 mounted at the other end of the locking pawl 104 has the tendency to engage in the ratchet rail 107. In the state shown in FIGS. 6 and 6a where the seat is locked in the memory position with the backrest not folded forward, the locking pawl is prevented from doing this in that the operating section 160 of the switch lever 106 is supported on the operating face 140 of the locking pawl 104 so that this cannot swivel about the bearing pin 155 in order to bring the detent hook 141 into engagement with the ratchet rail 107.

Furthermore in the situation illustrated in FIGS. 6 and 6a, a counter stop 144 of the locking pawl 104 is in contact with a stop 132 of a stop element 103 which is fixed by fixing screws 136 on the seat rail 102. Furthermore, a follower 143 of the locking pawl 104 which adjoins the stop 144 at the top is in engagement with an engagement area 134 of the stop element 103.

If in the situation illustrated in FIGS. 6 and 6a where the seat is locked in the memory position the backrest is folded forwards, then the cable 121b of the Bowden cable is tensioned and moved towards the rear seat end (on the backrest side).

Figure 7:
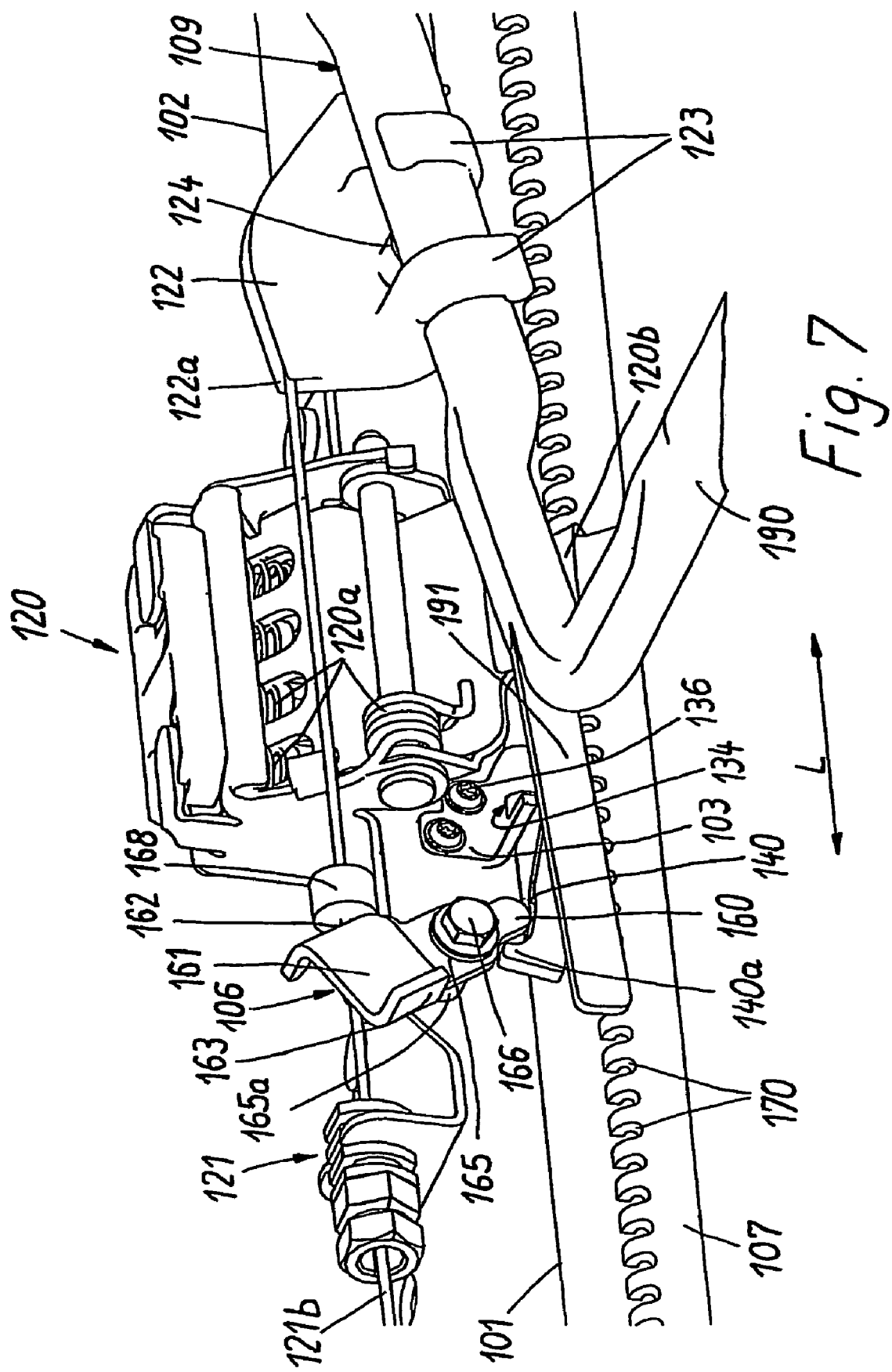
FIG. 7 shows a view according to FIG. 6 in a situation where the backrest has been folded forward in order that the seat can be moved with the backrest folded forward.

According to FIG. 7 on the one hand, the operating lever 109 is hereby swivelled anti-clockwise through the gearing part 122, as well as the arms 123, whereby it acts on the operating element 120b and releases the fixing device 120. On the other hand, the cable nipple 168 which is squashed with the cable 121b is moved in the direction of the rear seat end and thereby acts on the stop 162 in the upper section 161 of the switch lever 106. The switch lever 106 is thereby swivelled anti-clockwise whereby its operating section 160 is lifted clear of the associated operating surface 140 of the locking pawl 104. This swivel movement of the switch lever 106 is possible since the latter is no longer blocked by the lever projection 191 which would indeed be swivelled down jointly with the operating lever 109. Since the switch lever 106 has released the locking pawl 10, the latter now swivels under the action of the compression spring 400 (see FIG. 6a) about the bearing pin 155 of the slider 105 until the detent hook 141 engages in an opening 170 of the ratchet rail 107. The locking pawl 104 and thus overall the memory device is hereby locked.

The swivel movement of the locking pawl 104 moreover has the result that the follower 143 of the locking pawl 104 as well as the engagement area 134 of the stop element 103 move out of engagement. This is necessary in order that the seat frame can be displaced since otherwise movement of the seat would be blocked by the locked memory device.

The cable nipple 168 thereby serves as a locking means which when the backrest is folded forward acts on the switch lever 106 so that the locking pawl 104 cannot be unlocked by means of the switch lever 106.

The arrangement is designed so that on folding the backrest forward the detent hook 141 can already engage in a detent opening 170 under the action of the compression spring 400 before the fixing device 120 has been released so far that the seat rail 102 can be moved relative to the rail 101 which is fixed on the body. A reliable storing of the actual seat longitudinal position as the memory position is hereby guaranteed. If, however, the detent hook 141 cannot engage immediately in a detent opening 170 because the seat is positioned so that the detent hook 141 under the action of the compression spring 400 strikes a web between two detent openings 170, then the detent hook 141 only engages in the next detent opening 170 which it passes after a slight displacement of the seat frame in the seat longitudinal direction L. In such a case, there is thus a slight deviation between the seat longitudinal position on folding the backrest forward and the memory position then stored.

In the situation illustrated in FIG. 7 which was achieved by folding the backrest forward, the seat frame can now be pushed forward with the backrest folded forward in the seat longitudinal direction L in order to make it easier for the passenger to climb into the back of the vehicle or place an object therein.

If the seat is then moved back again with the backrest folded forward it is automatically stopped at the latest in the memory position defined by the locking pawl 104. For on reaching the memory position the stop 132 of the seat frame comes into contact with the stop 144 of the memory device whereby a further movement of the seat frame backward is prevented.

If then the backrest is again folded back into its function position, the tension of the cable 121b is released and the switch lever 106 as well as the operating lever 109 with the projection 191 fixed thereon return to the position illustrated in FIGS. 6 and 6a. If then the operating lever 109 is swivelled anti-clockwise in order to unlock the fixing device 120, then the position illustrated in FIG. 8 is reached.

On manually swivelling the operating lever 109 by means of the operating handle provided for this purpose, the fixing device 120 is indeed unlocked through the operating element 120b so that the seat frame can be moved in the seat longitudinal direction L onto the rail 101 which is fixed on the body; however—as opposed to folding the backrest forward—the switch lever 106 hereby remains in its upright position in which its operating section 160 acts vertically on the operating surface 140. This prevents the locking pawl 104 from becoming locked under the action of the compression spring 400.

Figure 8:
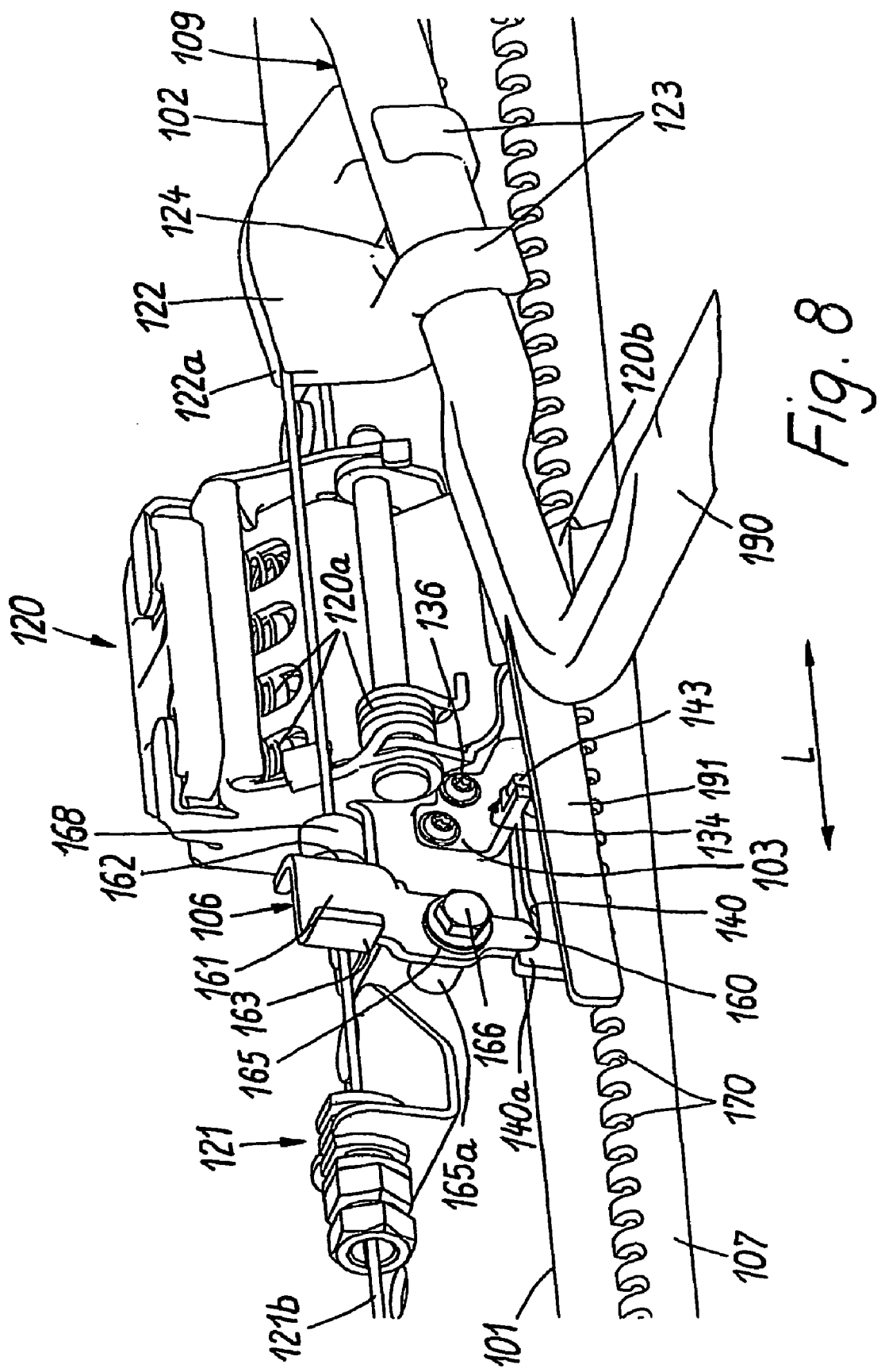
FIG. 8 shows a view according to FIG. 6 in a situation where with the backrest raised up in the memory position an actuating lever was actuated in order to re-set the memory position.

As a result of the lever projection 191 which is swivelled down according to FIG. 8 and which correspondingly does not bear against the associated stop 163 of the switch lever 106, the vertical position of the switch lever 106 must be secured for example by a suitable design of the operating face 140 of the locking pawl 104. The operating face 140 can for this purpose be curved so that under the action of the compression spring 400 of the locking pawl 104 it exerts no torque on the operating section 160 of the switch lever 106 which would cause the switch lever 106 to swivel anti clockwise. In other words, the clearance between the operating surface 140 of the locking pawl 104 and the operating section 160 of the switch lever 106 must be designed so that the forces introduced by the compression spring 400 from the locking pawl 104 do not trigger any swivel movement of the switch lever 106 anti-clockwise. A swivel movement of the switch lever 106 in the clockwise direction is on the other hand blocked by the cable nipple 168.

As an alternative, the upright position of the switch lever 106—as already mentioned above—can also be secured by means of a suitable spring element or by sufficiently large friction forces.

In short, the actuation of the operating lever 109 in the memory position of the seat (with the backrest not folded forward) has the result that, on the one hand, the fixing device 120 is released whilst at the same time the locking pawl 104 and thus the memory device overall remains in the unlocked state which already existed prior to swivelling the operating lever 109, see FIGS. 6 and 6a. Furthermore the follower 143 of the memory device engages in the engagement area 134 of the stop element 103 on the seat rail side.

In this state, a movement of the seat frame in the seat longitudinal direction L leads to the locking pawl 140 being entrained at the same time so that during displacement of the seat a new memory position is set again at the same time. The newly set memory position which corresponds to the seat longitudinal position newly set by sliding the seat frame is however not even then locked when finally the operating lever 109 is let go. For, according to FIGS. 6 and 6a, this has at first only the result that the fixing device 120 becomes locked and thus the seat rail 102 is stopped relative to the rail 101 on the body side. A locking of the memory device takes place on the other hand according to FIG. 7 only then when in the new seat longitudinal position the seat back is folded forward. Thus with the present embodiment the memory device is only then locked when the seat with the backrest folded forward is moved forward in easy entry function mode.

Figure 9:
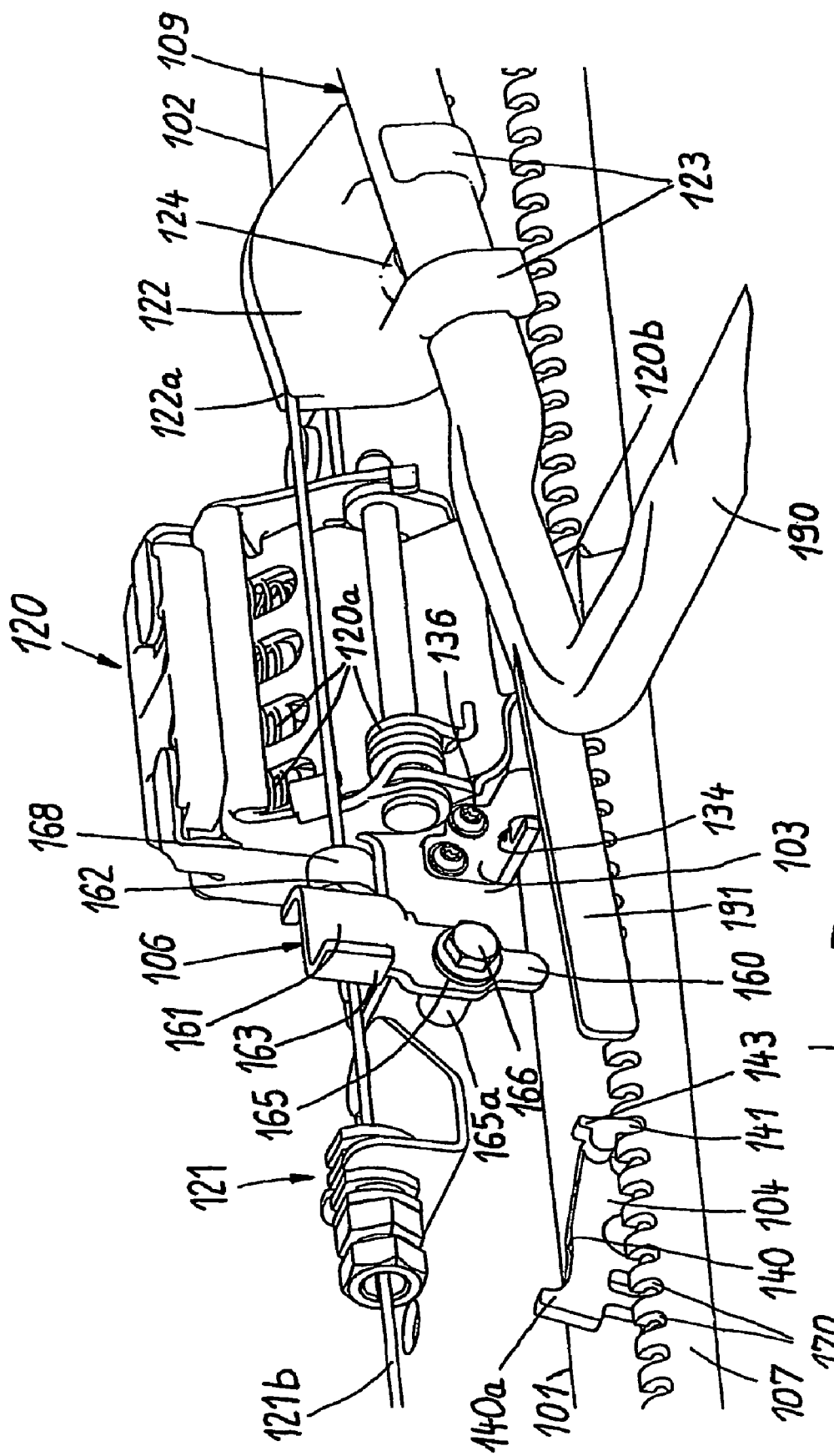
FIG. 9 shows a view according to FIG. 6 in a situation where the memory position of the seat with the raised up backrest is approached.

In FIG. 9 the seat frame is shown after it has first been pushed forward with the backrest folded forward in the seat longitudinal direction L whereby the locking pawl 104 has been left back locked in the original seat position, and after then the backrest has been folded back again into its function position. Furthermore the operating lever 109 is swivelled so that the fixing device 120 is released and the seat frame can be moved selectively forward or backward in the seat longitudinal direction. In each seat longitudinal position which is hereby reached, the seat frame can be locked by means of the fixing device 120 relative to the rail 1 fixed on the body, by letting go of the operating lever 109.

Figure 10:
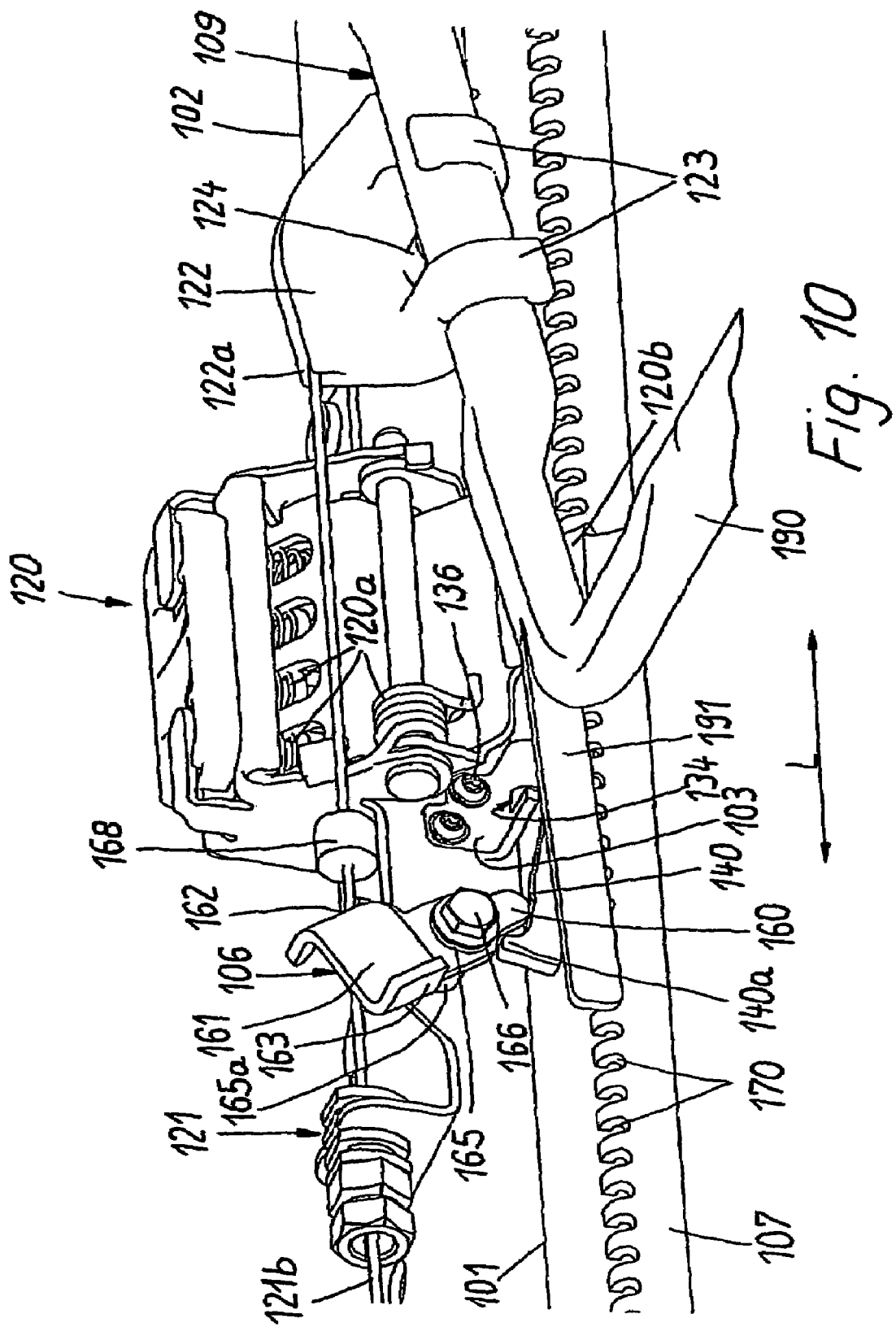
FIG. 10 shows a view according to FIG. 6 in a situation where the memory position of the seat is reached with the raised up backrest.

FIG. 10 finally shows the position of the seat frame when this is moved back with the backrest upright into the memory position. The switch lever 106 hereby stops with its operating section 160 against a projection 140a which protrudes vertically up from the operating surface 140 of the locking pawl 104. This is due to the fact that the locking pawl 104 is located in the locked state in which it engages by its detent hook 141 (see FIG. 6a) in a detent opening 170 in the ratchet rail 107. Through the inclined position of the operating face 140 of the locking pawl 104 connected therewith, the pawl exerts on the operating section 160 of the switch lever 106 a torque with a component parallel to the seat longitudinal direction L. As a result of this, the switch lever 106 is swivelled anti-clockwise and its operating section 160 enters into engagement with the projection 140a of the locking pawl 104. This has the effect that the locking pawl 104 remains locked when the seat lower frame reaches the memory position illustrated in FIG. 10.

In short, the operating face 140 interacts in the locked state of the locking pawl 104 with the operating section 160 of the switch lever 106 so that this is swivelled when the seat is pushed with the backrest upright into the memory position whereby unlocking of the locking pawl 104 is prevented. (If the seat with the backrest folded forward is pushed back into the memory position then the switch lever 106 as a result of the action of the cable nipple 168 is swivelled anyhow, see FIG. 7, so that even in this case no unlocking of the memory device can take place). On the other hand, the operating face 140 of the locking pawl 104 and the operating section 160 of the switch lever 106 interact in the unlocked state of the locking pawl 104, see FIG. 6, so that the locking pawl 104 remains unlocked as explained in further detail above with reference to FIG. 6.

As a result of the locked state of the locking pawl 104 the seat frame is automatically stopped on reaching the memory position if the stop 132 of the stop element 103 on the seat frame side becomes blocked with the counter stop 144 of the memory device (see FIG. 6a).

If then in the memory position the operating lever 109 is let go then this swivels clockwise under the action of the spring assembly 120a of the fixing device 120 until the fixing device 120 is locked again. At the same time through the projection 191 of the operating lever 109 which acts on the angled stop 163 in the upper section 161 of the switch lever 106 the switch lever 106 is swivelled clockwise into its upright position whereby the switch lever 106 acts by its operating section 160 on the operating surface 140 of the locking pawl 104 and unlocks same (against the action of the compression spring 400—which requires a corresponding design of the spring assembly 120a). The seat is then located again in the situation explained with reference to FIGS. 6 and 6a with the backrest raised up in the memory position.

A further development of the arrangement illustrated in FIGS. 6 to 10 will now be described with reference to FIGS. 1 to 5. The same reference numerals are used for corresponding component parts so that to explain the corresponding component parts reference is made to the details regarding FIGS. 6 to 10. The following description of FIGS. 1 to 5 is therefore restricted to discussing the differences in respect of the arrangement illustrated in FIGS. 6 to 10.

In FIGS. 1 to 5, for clarity those details which are not significant for the development according to the invention have been omitted. In this respect, reference is made to FIGS. 6 to 10.

Figure 1:
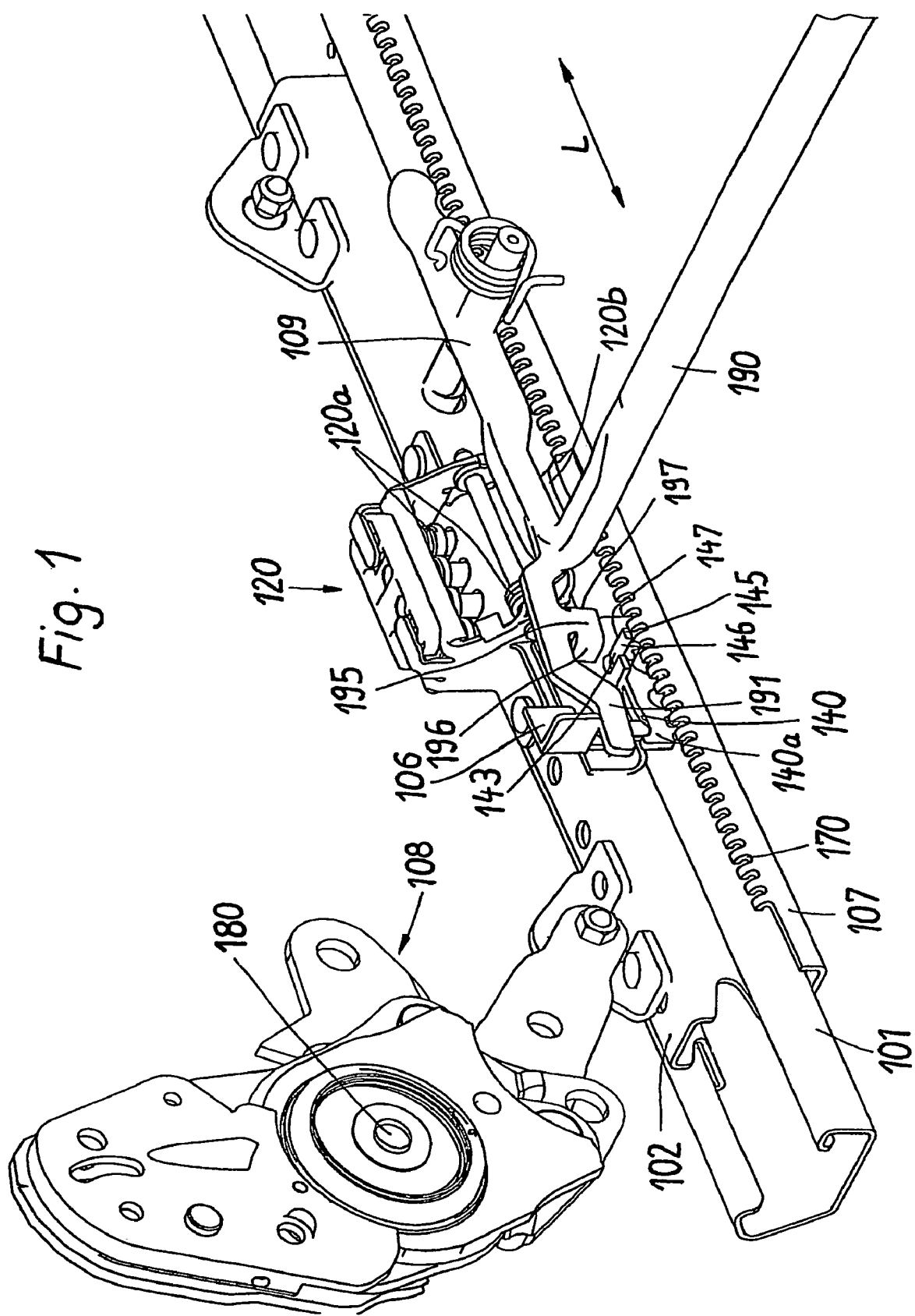
FIG. 1 shows a perspective view of a part of a seat frame having a seat longitudinal guide, with a fixing device for the seat longitudinal guide, a seat side part on which a backrest is pivotally mounted, as well as with a programmable memory device for automatically seeking a predeterminable seat longitudinal position, namely in the case of a seat frame which is located with the (raised up) backrest located in its useful position in its memory position wherein the fixing device is locked.

FIG. 1 shows (as mentioned, whilst leaving out some details) a further development of the seat assembly shown in FIG. 6, namely likewise in a situation in which the seat is locked in its memory position with the backrest raised up. Additionally, FIG. 1 still shows a height adjustable seat side part 108 provided on the seat rail 102 and having a bearing 180 for swivel fitting a backrest.

The essential difference from the embodiment shown in FIG. 6 is that according to FIG. 1 a claw 195 projects from the lever projection 191 of the operating lever 109 and has two side stops 196, 197 spaced from each other in the seat longitudinal direction L. This claw is associated with a projection 145 of the follower 134 provided on the locking pawl 104 and likewise having two stops 146, 147 spaced from each other in the seat longitudinal direction. The claw 195 and the projection 145 serve as engagement elements which can be brought into engagement with each other in order to prevent movement of the seat rail 102 relative to the rail 101 on the body side.

In the state illustrated in FIG. 1 in which the seat rail 102 (and thus the seat frame) is locked in the memory position relative to the rail 101 on the body side with the backrest raised up, the two engagement elements 195, 145 are out of engagement.

If now in this state the backrest of the seat is folded forward toward the seat surface (see FIG. 11) in order to release the easy-entry function, then both the locking pawl 104 and the lever projection 191 swivel about their relevant swivel axis. The projection 145 of the follower 143 hereby meshes in engagement with the claw 195, namely precisely in the position in which the backrest is not yet folded so far onto the seat surface that the fixing device 120 is completely released.

Figure 2:
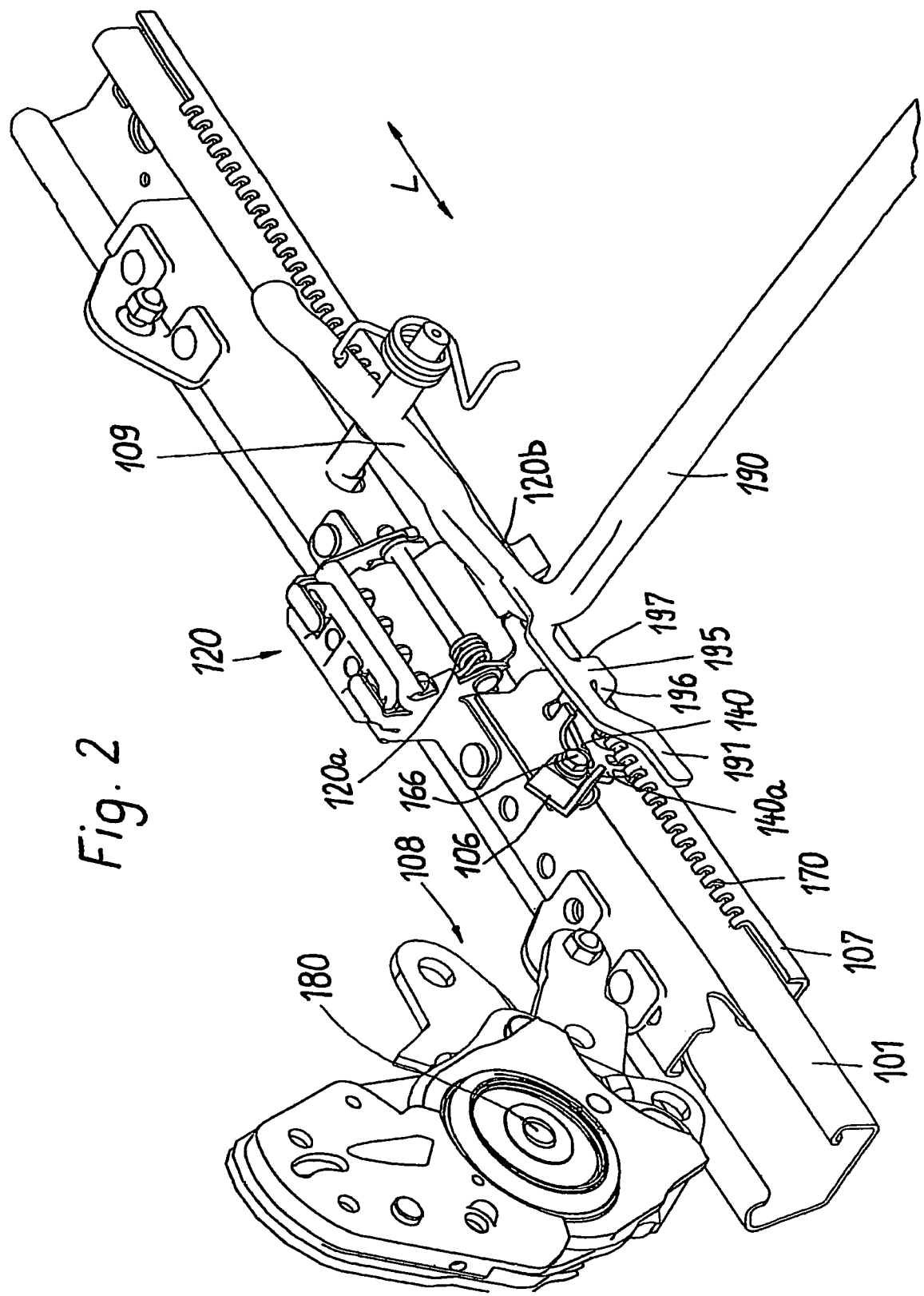
FIG. 2 shows a view according to FIG. 1 after partially folding the backrest forward from its useful position but before the backrest has been folded completely onto the seat surface.
Figure 3:
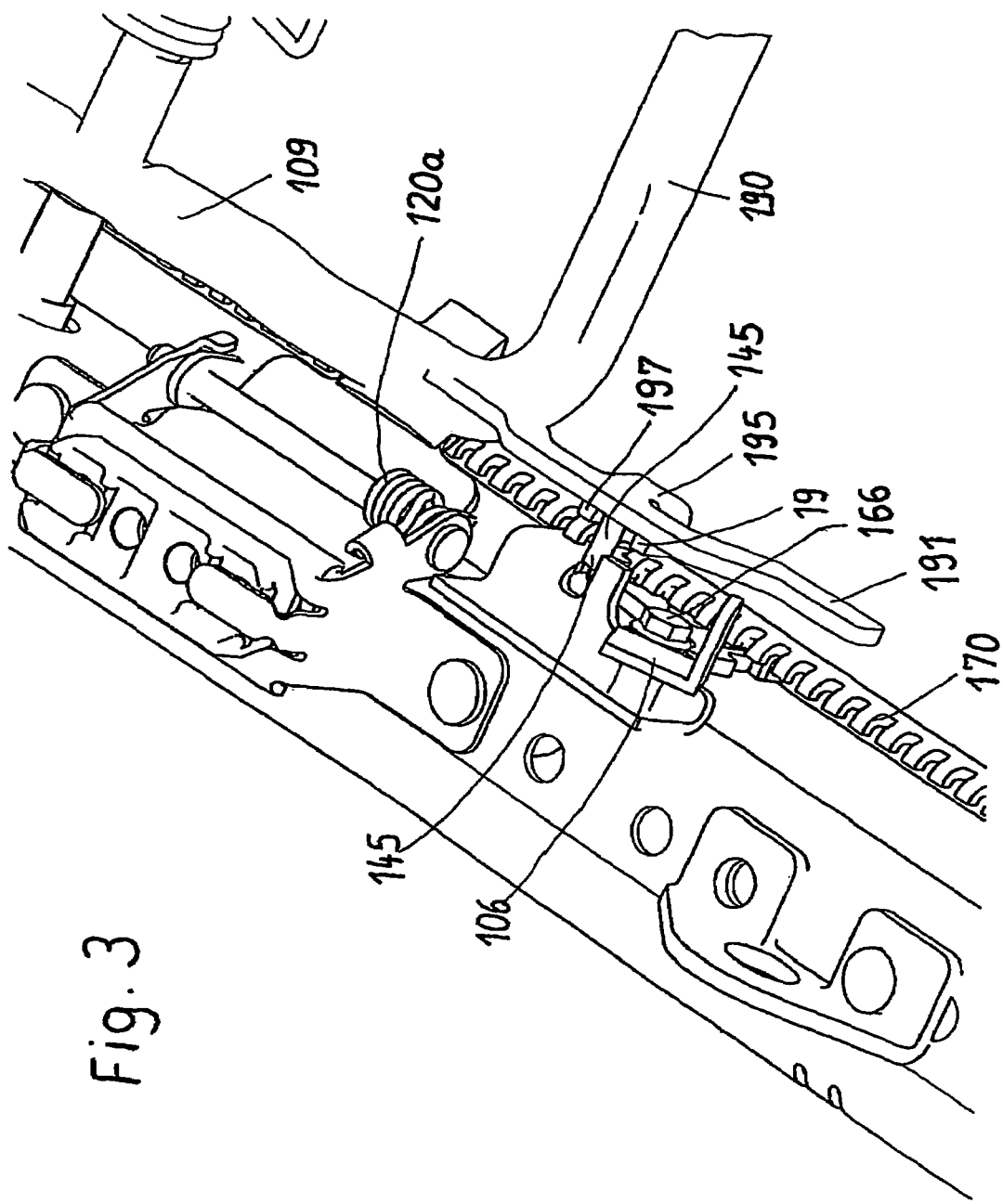
FIG. 3 shows a detail from FIG. 2.
Figure 4:
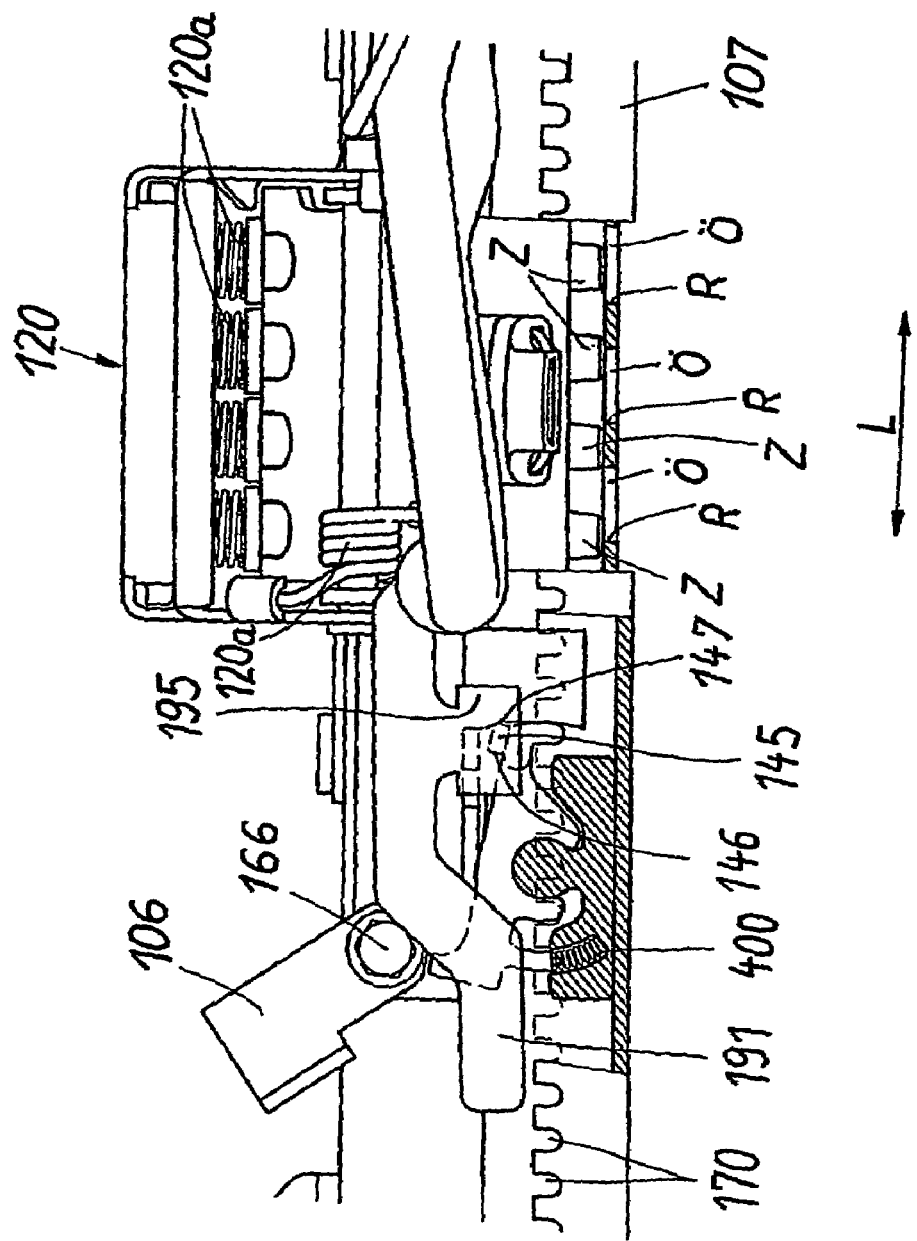
FIG. 4 shows a side view of the detail according to FIG. 3.

In this situation, shown in FIGS. 2 to 4 the lever projection 191 is still not yet completely swivelled down and the claw 195 provided on this lever projection 191 engages by its side stops 196,197 round the engagement element 145 of the follower 143 whereby each of the stops 146, 147 of the engagement element 145 is associated precisely with the stop 196 and 197 of the claw 195.

As can be seen in particular from FIG. 4, in this situation the locking teeth Z of the fixing device 120 are already lifted so far out of the associated detent openings o that movement of the two rails 101, 102 relative to each other in the seat longitudinal direction L would be possible. Unlocking the fixing device 120 has however still not yet completely taken place for the locking teeth Z would with the said movement slide in the seat longitudinal direction over the edges R of the detent openings o which would lead to unacceptable noises.

Such a relative movement of the two seat rails 101, 102 is in the present case however ruled out since the claw 195 engages round the engagement element 145 of the follower 143 provided on the locking pawl 104. For the claw 195 is formed on the lever projection 191 which in turn forms a constituent part of the operating lever 109 attached to the rail 102 on the seat side. The engagement element 145 of the follower 143 is however provided on the locking pawl 104 which already engages in the detent openings 170 of the associated ratchet rail 107 and thus is locked relative to the rail 101 on the body side. Thus two engagement elements 145, 195 engage here in each other of which one, namely the engagement element 145 formed on the follower 143 is provided on the rail 101 on the body side, and of which the other, namely the engagement element formed as the claw 195 is provided on the rail 102 on the seat side. Movement of these two rails 101, 102 relative to each other in the seat longitudinal direction L is hereby impossible.

Decisive for this is that in the situation in which the locking teeth Z of the fixing device 120 are disengaged just so far from the associated detent openings o that a grinding movement in the seat longitudinal direction L would be possible, the locking pawl 104 already engages in the ratchet rail 107 under the action of the spring element 00 (compression spring). This is achieved in that the switch lever 106 is already swivelled sufficiently in this state in order to release the locking pawl 104.

Figure 5:
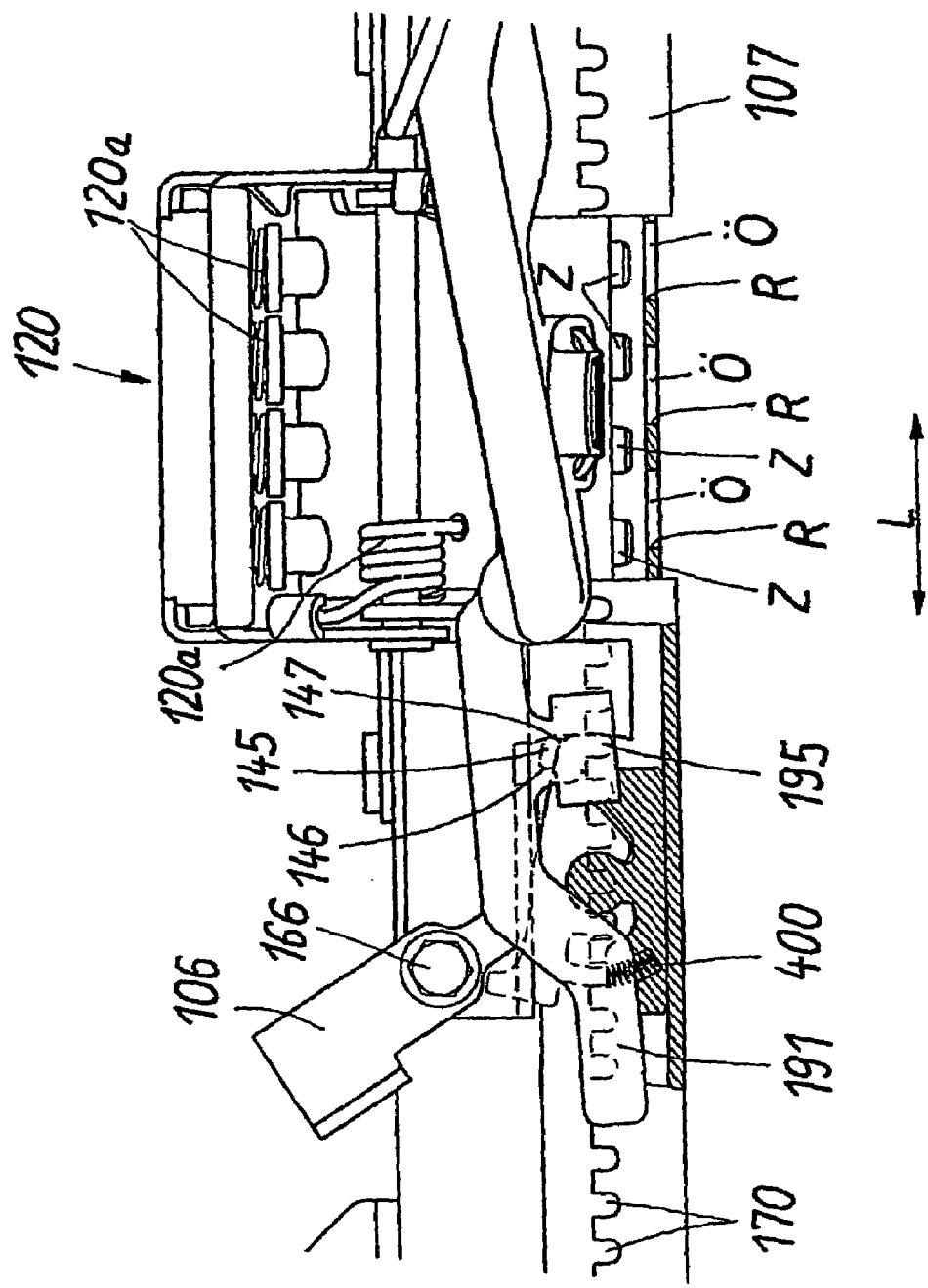
FIG. 5 shows the detail according to FIGS. 3 and 4 after folding the backrest fully onto the seat surface.

It can finally be seen from FIG. 5 that after a complete release of the fixing device 120, thus after the locking teeth Z have been completely lifted out of the associated detent openings o, the engagement element 145 provided on the locking pawl 104 is located above the claw 195 so that now nothing is in the way of a relative movement of the seat rail 102 (and thus the entire seat frame) relative to the rail 101 on the body side.

The invention claimed is:

1. Motor vehicle seat comprising:
a seat frame;
a backrest mounted pivotally on the seat frame and movable into an upright position and a forward position folded toward a seat surface of the seat frame;
a longitudinal guide along which the seat frame is movable in a seat longitudinal direction for adjusting a seat longitudinal position;
a fixing device adapted to adopt a locked configuration for locking the seat frame in a seat longitudinal position along said longitudinal guide, said fixing device further adapted to adopt a fully released configuration for releasing said seat frame from said seat longitudinal position;
an operating element adapted to unlock the fixing device thereby rendering the seat frame movable from the seat longitudinal position in the seat longitudinal direction to allow adjustment of the seat longitudinal position;
a coupling mechanism movable together with the seat frame in the seat longitudinal direction, the coupling mechanism configured to act on the operating element to unlock the fixing device when the backrest is folded toward the forward position;
a memory device to stop the seat frame during movement in the seat longitudinal direction at a predeterminable memory position;
adjusting means for the memory device configured to adjust the memory position in the seat longitudinal direction;
a locking device for locking the memory device in a set memory position; and
a first engagement element coupled to and movable by the coupling mechanism and a second engagement element provided on the memory device, the engagement elements adapted to be brought into engagement with each other upon exertion of a force on the operating element in order to unlock the fixing device, the engagement elements further adapted to be in engagement with each other to prevent adjustment of the seat longitudinal position in the seat longitudinal direction while
a) the seat frame is located in its predetermined memory position,
b) the memory device is locked by the locking device, and
c) the fixing device is out of the locked configuration and approaching the fully released configuration so as to not prevent adjustment of the seat longitudinal position in the seat longitudinal direction.

2. Motor vehicle seat according to claim 1, wherein the first engagement element is mounted on the coupling mechanism.

3. Motor vehicle seat according to claim 1 or 2, wherein the first engagement element is mounted on a lever of the coupling mechanism to act on the fixing device.

4. Motor vehicle seat according to claim 1, wherein the second engagement element is provided on the locking device.

5. Motor vehicle seat according to claim 1, wherein the locking device has a locking unit movable in the seat longitudinal direction together with a counter stop of the memory device.

6. Motor vehicle seat according to claim 5, wherein the locking unit comprises a detent device which has detent positions arranged along the seat longitudinal direction to define a plurality of set memory positions at which the locking unit may be locked.

7. Motor vehicle seat according to claim 6, wherein the locking unit comprises a swivel mounted locking pawl which has a catch element adapted to engage at the detent positions.

8. Motor vehicle seat according to claim 7, wherein the second engagement element is provided on the swivel mounted locking pawl.

9. Motor vehicle seat according to claim 1, wherein each of the engagement elements has stops adapted for active connection in order to produce the engagement between the engagement elements.

10. Motor vehicle seat according to claim 9, wherein one of the engagement elements is a claw.

11. Motor vehicle seat according to claim 1, wherein the fixing device has locking teeth of which at least one is adapted for insertion into one of a plurality of catch openings arranged in the seat longitudinal direction along the longitudinal guide.

12. Motor vehicle seat according to claim 11, wherein the two engagement elements are in engagement while the locking teeth are initially lifted by the coupling mechanism out of the catch openings, the engagement of the engagement elements preventing movement of the seat frame in the longitudinal direction that would otherwise cause the locking teeth to grind against the longitudinal guide.

13. Motor vehicle seat according to claim 1, wherein the two engagement elements are out of engagement when the fixing device is completely released.

14. Motor vehicle seat comprising:
a seat frame;
a longitudinal guide along which the seat frame can be moved in a seat longitudinal direction for adjusting a seat longitudinal position;
a fixing device adopted to lock the seat frame in a seat longitudinal position;
an operating element for unlocking the fixing device so that the seat frame is movable in the seat longitudinal direction from the seat longitudinal position;
a release mechanism movable together with the seat frame in the seat longitudinal direction, the release mechanism adapted to act on the operating element thereby unlocking the fixing device;
a memory device adapted to stop movement of the seat frame during movement in the seat longitudinal direction at a predeterminable memory position;
adjusting means adapted to adjust the memory position of the memory device in the seat longitudinal direction; and
a locking device for locking the memory device in a set memory position; and
a first engagement element coupled to and movable by the release mechanism and a second engagement element provided on the memory device, the two engagement elements adapted to be brought into engagement with each other upon exertion of a force on the operating element in order to unlock the fixing device and adapted to be in engagement with each other to prevent adjustment of the seat longitudinal position in the seat longitudinal direction while
a) the seat frame is located in its memory position,
b) the memory device is locked by the locking device, and
c) the fixing device remains in contact with the longitudinal guide and is unlocked therewith.

15. A motor vehicle seat of claim 1 or 14, wherein the engagement elements are adapted to be out of engagement while the seat frame is locked in the memory position by the fixing device.

16. A motor vehicle seat for use by an operator, comprising:
a seat frame;
a longitudinal guide aligned along a longitudinal direction;
a fixing device adapted to movably support the seat frame on the longitudinal guide for movement in the longitudinal direction, the fixing device comprising:
teeth biased to engage apertures provided in said longitudinal guide and lock said seat frame in a seat longitudinal position along the longitudinal guide;
an operative element adapted to move said teeth out of engagement with said apertures and permit said seat frame to be movable from said seat longitudinal position along said longitudinal guide;
a release mechanism provided on said seat frame and having a member for use by said operator to control said operative element to release said teeth from engagement;
a memory device configured to lock in a memory position along said longitudinal direction, having:
a locking device to lock said memory device in the memory position when said memory device is detachable from the seat frame; and
a first engagement member provided on said release mechanism and a second engagement member provided on said memory device, said engagement members being brought into engagement with each other so as to avoid relative movement between said seat frame and said longitudinal guide while the operator has actuated the release mechanism member to release the teeth from engagement and maintained in engagement until said teeth are sufficiently removed from said apertures to avoid contact between the teeth and the longitudinal guide.

17. A motor vehicle seat of claim 16, wherein the second engagement member comprises a follower for detachable movement of said memory device with the seat frame in said longitudinal direction, where engagement of said follower with said first engagement member occurs after the locking device has locked in said memory position.

18. A motor vehicle seat of claim 16, further comprising:
a back rest pivotally mounted on said seat frame, said back rest movable into and between an upright position and a forward position; and
a switch mechanism responsive to movement of said back rest into said forward position from said upright position to enable the memory device to lock in said memory position.

19. A motor vehicle of claim 16, wherein said memory device is adapted to unlock only when its memory position coincides with the seat longitudinal position of said seat frame.

20. A motor vehicle seat of claim 16, wherein said memory device is detachable from said seat frame to lock in a memory position different from the predeterminable seat longitudinal position of said seat frame.

21. A motor vehicle seat of claim 16, wherein said first and second engagement members are disengaged when the fixing device is in a fully released configuration.

22. A motor vehicle seat of claim 16, wherein the engagement members are adapted to be out of engagement while the seat frame is locked in the memory position by the fixing device.

* * * * *

UNITED STATES PATENT AND TRADEMARK OFFICE
CERTIFICATE OF CORRECTION

PATENT NO. : 7,140,683 B2
APPLICATION NO. : 10/416932
DATED : November 28, 2006
INVENTOR(S) : Rausch et al.

It is certified that error appears in the above-identified patent and that said Letters Patent is hereby corrected as shown below:

On the Title Page

(73) Assignee             Delete "Fahrzeugtelle",
                                      Insert --Fahrzeugteile--

In the Claims

Column 15, line 11, Claim 14      Delete "adopted",
                                                      Insert --adapted--

Signed and Sealed this

Twenty-seventh Day of November, 2007

JON W. DUDAS
*Director of the United States Patent and Trademark Office*